United States Patent Office 3,360,536
Patented Dec. 26, 1967

3,360,536
METHOD OF PREPARING CUPROUS ACYLATES AND CUPROUS AMMONIUM ACYLATES
James E. McKeon and Paul S. Starcher, Charleston, W. Va., assignors to Union Carbide Corporation, a corporation of New York
No Drawing. Filed Dec. 27, 1963, Ser. No. 334,007
3 Claims. (Cl. 260—438.1)

ABSTRACT OF THE DISCLOSURE

Preparation of cuprous acylates and/or cuprous ammonium acylates by reacting a cupric acylate and/or a cupric ammonium acylate, an olefinically unsaturated compound, a palladium (II) compound and a saturated aliphatic monocarboxylic acid.

---

This invention relates to the manufacture of cuprous acylates and to solutions containing these acylates.

Cuprous acylates have found significant utility in the treatment of olefin-containing petroleum hydrocarbon mixtures to extract and absorb certain of the olefins and thereby produce a purer mixture. Cuprous acylates have also been found desirable for extracting certain gases from gas mixtures. In addition to these useful properties, cuprous acylates may be employed as hydrogenation catalysts, reducing agents, in the conversion of ortho-para hydrogen and in the preparation of "copper liquor" used in the purification of $NH_3$ synthesis gas.

It is herein described a novel process for the manufacture of cuprous acylates and cuprous ammonium acylates which avoids the formation of undesirable by-products. The process of this invention provides for the production of cuprous acylate or cuprous ammonium acylate in the essential absence of competitive anions for the cuprous ions which would form products of limited utility. Moreover, the process of this invention achieves significantly greater rates of production of cuprous acylate or cuprous ammonium acylate over that obtained, e.g., by using copper metal to reduce cupric acetate.

The cuprous compounds of this invention are produced by forming a reaction mixture of an olefinically unsaturated compound, cupric acylate and/or cupric ammonium acylate, and a metal salt and/or complex wherein the metal is other than copper and is in the higher of at least two stable oxidation states.

The acyl ion of the cupric acylate is derived from a monocarboxylic acid having an ionization constant less than $5 \times 10^{-3}$ determined in water at 25° C. Desirably, the acylates are derived from saturated aliphatic monocarboxylic acids of up to 18 carbon atoms, e.g., formic acid, acetic acid, n-propionic acid, n-butanoic acid, n-pentanoic acid, 2-ethylhexanoic acid, 2-carboxybutane, and the like; the cycloalkylcarboxylic acids such as cyclohexylcarboxylic acid, cyclopentylcarboxylic acid, and the like; and the aromatic containing carboxylic acids, such as benzoic acid, naphthoic acid, phenylacetic acid, and the like. The carboxylic acid should be free of non-benzenoid carbon to carbon unsaturation. Alkanoic acids of from 1 to 10 carbon atoms and cycloalkyl acids of from 5 to 6 carbon atoms in the ring are preferred. Significantly desirable are the saturated fatty acids of from 1 to 4 carbon atoms, such as formic, acetic, propionic, and butyric acids, with acetic acid the most desirable of the class.

The metal salt and/or complex utilizable in the process of this invention is one which is formed from the aforementioned carboxylic acids or other weak acids which have an ionization constant not greater than $5 \times 10^{-3}$, determined in water at 25° C., or the hereinafter defined complexing agents, and a metal possessing at least two stable oxidation states. Such a metal may be utilized as the defined salts or as a complex with one of a plurality of ligands, such as β-dicarbonyl ketones and esters, e.g., malonic acid esters, acetylacetone, and methylacetoacetate; β-ketonitriles, e.g., acetoacetonitrile; and the like complexing agents. The complexing agents are preferably organic and typically possess ionization constants appreciably lower than that of the weak acids.

The aforementioned salt of weak acids other than the carboxylic acids includes salts derived from inorganic acids having an ionization constant not greater than $5 \times 10^{-3}$, such as sodium dihydrogen phosphate, disodium hydrogen phosphate, and other alkali metal salts of hydrogen phosphates, arsenious acid, sodium dihydrogen arsenate, and the like.

Particularly desirable metals which may be employed for making the metal salts and/or complexes are the precious metals of the transition series. This includes palladium, platinum, iridium, rhodium, ruthenium, osmium and gold. Palladium because of relatively low cost and for other processing reasons is particularly preferred.

It is, of course, to be appreciated that any selected metal in the performance of the aforementioned metal salts or complexes in the process is dependent upon the chosen ligand. Since the aforementioned metal salts apparently become complexes in the solutions of this invention, the acylate anion is also termed a ligand herein. Moreover, other process variables govern the performance level of this metal compound, such as the olefinic compound introduced into the mixture, temperature, concentration of the components of the mixture, and the like. Thus, each metal compound may require a favorable environment for its use in the present invention.

In view of the preference for palladium, the remaining discussion of this invention is specific to its use as a salt or complex. It is to be understood that other metals within the standards defined previously may be substituted for palladium and utilized in accordance with the discussion herein.

The olefinically unsaturated compounds or olefinic compounds employed in the mixture which result in the formation of the cuprous acylates and/or cuprous ammonium acylates include many compounds, particularly those containing at least one ethylenic group, i.e., $>C=C<$, which possesses at least one free hydrogen atom on each carbon atom of the group.

Olefinic compounds useful in this process may be, e.g., any olefin or mixture of olefins, such as found in petroleum.

Olefinic compounds which are particularly efficient in the reduction process of this invention, are those characterized by the following formula:

(I) $\qquad$ $RHC=CHR$ wherein each R can be either hydrogen or a monovalent hydrocarbon radical free of acetylenic unsaturation, e.g., alkyl, cycloalkyl, alkenyl, cycloalkenyl, aryl, aralkyl, alkaryl, and the like. In addition, both R's together with the ethylenic carbon atoms of Formula I, supra, may represent a cycloaliphatic hydrocarbon nucleus containing from 5 to 12 carbon atoms, preferably from 5 to 8 carbon atoms. Illustrative are cyclopentene, cyclohexane, cycloheptene, cyclooctene, cyclododecane, their alkyl and aryl derivatives, and the like.

Illustrations of R include, hydrogen, methyl, ethyl, n-propyl, isopropyl, n-butyl, isobutyl, sec-butyl, the pentyls, the hexyls, the heptyls, the octyls, the dodecyls, the octadecyls, vinyl, allyl, 1-propenyl, 1-butenyl, 2-butenyl, 3-butenyl, the hexenyls, the octenyls, the cyclopentyl, cyclohexyl, cycloheptyl, cyclohexenyl, phenyl, tolyl, xylyl, ethylphenyl, propylphenyl, benzyl, phenylethyl, phenylpropyl, phenylbutyl, and the like. Illustrative olefinic compounds include, ethylene, propylene, 1-butene, 2-butene, 1-pentene, 2-pentene, 1-hexene, 2-hexene, 3-hexene, 1-heptene, 2-heptene, 3-heptene, the octenes, the decenes, the dodecenes, the octadecenes, cyclopentene, cyclohexene, cycloheptene, cyclooctene, cyclododecene, lower alkyl (1 to carbon atoms) substituted cyclopentene, lower alkyl (1 to 4 carbon atoms) substituted cyclohexene, lower alkyl (1 to 4 carbon atoms) substituted cycloheptene, butadiene, 1,3-pentadiene, isoprene, 1,3-hexadiene, 1,5-hexadiene, the heptadienes, 1,7-octadiene, the dodecadienes, 4-vinylcyclohexene, vinylcyclohexane, allylcyclohexane, vinylcyclopentane, styrene, 3-phenylpropene-1, 4-phenylbutene-1, bicyclo[4.3.0]nona-3,7-diene, the methyl substituted styrenes, the ethyl substituted styrenes, mixtures of any of the above, and the like.

Preferred olefinic compounds include the alkenes especially those which have from 2 to 8 carbon atoms; the alkadienes especially those which have from 4 to 8 carbon atoms; the cycloalkenes especially those which have from 5 to 6 carbon atoms in the cycloalkenyl nucleus; the vinylcycloalkanes especially those which have from 5 to 6 carbon atoms in the cycloalkyl nucleus; the α-alkenylbenzenes especially those which have from 2 to 4 carbon atoms in the α-alkenyl moiety thereof; and the like. Highly preferred olefinic compounds include, ethylene, propylene, 1-butene, butadiene, isoprene, cyclohexane, 4-vinylcyclohexane, and styrene. Ethylene is most preferred. Of course, it is to be understood that this invention is not restricted to use of olefins characterized by Formula I.

The reduction of the cupric acylate and/or cupric ammonium acylate may be effected simply by intermixture of the aforementioned ingredients, to wit, the metal salt or complex and the olefinic compound with the cupric acylate or cupric ammonium acylate. The reduction reaction may be conducted over a wide temperature and pressure range and the selection of a specific pressure and temperature for optimum results will depend upon various factors, such as the nature of the olefinic reagent, the cupric compound, the metal salt or complex, the concentration of the component in the reaction, whether a solvent is employed and the particular solvent chosen, the equipment employed, and the like.

The reaction temperature typically ranges from 0° C. to 250° C., though lower and higher temperature may be found suitable. A particularly suitable temperature range is from about 20° C. to about 200° C. In general, the reaction proceeds more favorably at elevated temperatures. A reaction temperature in the range of from about 50° C. to about 160° C. is preferred. Significant results are observed at temperatures ranging between 80° C. and 130° C.

When the olefin is normally gaseous, it is desirable to operate the process at super atmospheric pressures. On the other hand, when the treated olefin is liquid at operating temperatures then pressures less than atmospheric may be employed. In general, wide pressure ranges are within the purview of this invention. It is desirable to employ a total pressure which is at least one atmosphere. In many instances, it is preferred to utilize a total pressure slightly greater than one atmosphere up to 300 atmospheres and higher. A total pressure of about 10 to 100 atmospheres is highly preferred when gaseous olefins are employed.

The reaction may be effected for a period of time ranging from seconds to several hours depending upon the correlation of factors embodying the operation of this process. For example, the reaction can be completed in less than one second or up to ten hours or longer.

The reduction of the cupric cation can be effected in the liquid phase over a fixed bed or, alternatively, it can be conducted as a non-homogeneous or homogeneous liquid phase reaction. For many reasons, the homogeneous liquid phase reaction is preferred.

The non-homogeneous or homogeneous liquid phase reaction requires the presence of a liquid substance which may be any one of the aforementioned components of the mixture if a liquid at the temperature of reaction. However, it is most desirable to utilize a solvent for the metal salt or complex and copper species to provide the liquid phase. Significantly desirable solvents include the saturated aliphatic monocarboxylic acids having a melting point less than 150° C. and a boiling point typically not greater than 250° C., determined at atmospheric pressure. The carboxylic acid, in order to be utilized as a solvent, should be liquid at the temperature at which the reaction is effected.

Illustrative monocarboxylic acids suitable as solvents are those disclosed above as usable for the formation of the cupric and metals salts. Another class of liquids which may be utilized as a solvent or as a diluent in conjunction with the aforementioned carboxylic acids is an inert, liquid organic vehicle such as hydrocarbon nitrile, e.g., acetonitrile, propionitrile, benzonitrile, and the like; the dialkyl sulfoxides, e.g., dimethyl sulfoxide, and the like; the cyclic sulfoxides, e.g., tetrahydrothiophene-1-oxide, and the like; the dialkyl sulfones, e.g., dimethyl sulfone, and the like; the N,N-dialkylcarboxamides, e.g., N,N-dimethylacetamide, N,N-dimethylformamide, and the like; the cyclic sulfones, e.g., sulfolane, and the like; the dialkyl and cyclic carbonates, e.g., diethyl carbonate, ethylene carbonate, and the like; the aliphatic and cyclic ethers, e.g., tetrahydrofuran, dioxane, dimethyl ether of diethylene glycol, dimethyl ether of triethylene glycol, and the like; ketodioxane, and the like.

The reaction may be controlled so as to provide for specific concentrations of cuprous acylates or cuprous ammoniumacylates. Such control may be effected by the addition of the olefin to the solution thereby converting cupric to cuprous, or by the incremental addition of oxygen which converts cuprous to cupric. In this manner there may be produced a variety of solutions, each having a different ratio of cupric to cuprous thereby providing greater utility to the solutions produced by the present process.

As mentioned previously, the process of this invention may be obtained in the essential absence of competitive anions for the cuprous ion thereby eliminating the production of products which have limited, and often undesirable, utilities. For example, it would be significantly undesirable to introduce to the aforementioned mixture in which reduction of the cupric cation takes place, such anions as halides (e.g., chloride, bromide, and iodide) and other anions from strong mineral acids having an ionization constant greater than $5 \times 10^{-3}$. The presence of such anions in the mixture result in the formation of relatively insoluble cuprous salts which seriously deplete the amount of utilizable salt. Most significantly undesirable are the halide salts which tend to require corrosion resistant equipment in the treatment of hydrocarbon streams. Moreover, such halide salts are potential halogenating agents when used in the separation of olefins from petroleum hydrocarbon mixtures.

Therefore, it is desirable to provide that the aforementioned mixture in which the cuprous acylates and/or cuprous ammonium acylates are formed be essentially free of halogen and strong mineral acids having an ionization constant greater than $5 \times 10^{-3}$, e.g., less than 25 parts per million, basis weight of the liquid mixture.

It has been found that the reduction reaction is most favorably operated when there is present in the mixture of a detectable amount of titratable base. Such a base is determined by titrating the mixture with a solution consisting of a measurable amount of perchloric acid in acetic acid. The titratable base may be cupric salt or complex or another basic salt added for this purpose. Generally, the titratable base may be present in trace amounts up to saturation of the reaction mixture. Amounts of base in excess of saturation may be also employed.

The function of the titratable base is not wholly appreciated. It has been noted that the ease of operation of the present process (e.g., productivity) is greatly enhanced by the presence of some titratable base.

It has been found desirable to provide as the titratable base in the reaction mixture, a basic salt of the aforementioned carboxylic acids. This salt may be added per se or formed in situ in the reaction by addition of a basic compound capable of forming the salt. It is important that the salt or the basic compound which forms the salt does not interfere with the reduction reaction, or if the salt does interfere it is capable of being readily removed from the reaction medium. A basic salt of a strong base capable of forming a monocarboxylate in water and/or the solvents, such as the carboxylic acid and inert normally-liquid solvents, is preferred. Illustrative salts include, metal carboxylates wherein the metal is an alkali metal such as sodium, potassium, lithium, and the like; an alkaline earth metal such as magnesium, calcium, barium, and the like; transition metals, such as lead, tin, zinc, cadmium, iron, zirconium, titanium, and the like. Preferably, the cation of the salt of the monocarboxylic acid is an alkali metal which forms carboxylates, such as sodium acetate, potassium acetate, lithium acetate, potassium propionate, sodium propionate, lithium propionate, and the like; the Group II metal carboxylates, such as barium acetate, zinc acetate, magnesium acetate, cadmium acetate, zinc propionate, and the like; various other transition metal monocarboxylates such as cobalt acetate, nickel acetate, manganous acetate, and the like.

The amount of the above basic salts including the alkali metal, the alkaline earth metal, transition metal salts, etc., is variable. The salts may be employed in trace amounts up to 50 percent by weight of the reaction mixture, or more, e.g., up to full saturation of the salt in the solution. Even higher concentrations of the salts are contemplated. Concentration far in excess of saturation, e.g., a slurry of the salt, may be employed.

On the other hand, the process may be carried out in the total absence of the aforementioned salts as additional additives to the mixture thereby leaving the cupric and metal salts or complexes as the sole titratable base present in the reaction mixture. The cupric acylates and/or ammonium acylates, and the metal salts or complexes, e.g., palladium diacetate and cupric acetate, may serve as the titratable base.

The metal salt or complex wherein the metal is in at least the higher of at least two potential oxidized states is, of course, a reducible metal, i.e., a metal which may be converted to a lower state of valence. This metal salt or complex, e.g., Pd (II), is present in amounts sufficient to catalytically induce the reduction of cupric cation to the cuprous cation. When the process is effected in the non-homogeneous or homogeneous liquid phase, a suitable reducible metal salt or complex concentration may be between about $1 \times 10^{-6}$ weight percent and lower, to about 5 weight percent and higher, calculated as the metal (e.g., palladium), per se, based on the total weight of liquids employed in the reaction. A preferred concentration is in the order of about 0.00001 to about 1.5 weight percent of the catalysts (calculated as Pd (II)), basis weight of liquids. The character of the reagents, the operative conditions under which the reaction is conducted, the solvent characteristics, and other factors will significantly determine the reducible metal salt or complex concentration necessary for optimum results. The source of the reducible metal, i.e., whether the reducible metal is best usable in salt or complex form is based on whether the compound is readily soluble in the reaction medium or can become soluble therein by reaction with one of the components in the medium. Thus, the reducible metal may be a compound of palladium other than the salt or complex form which upon incorporation into the medium forms the desired salt or complex.

The operative state for palladium for effecting the reaction is the Pd (II) oxidation state. The aforementioned salts or complex forms employable in the case of Pd (II) include, palladous acylates of the aforementioned monocarboxylic acids, e.g., palladous formate, palladous acetate, palladous propionate, palladous butyrate, palladous hexanoate, palladous cyclohexanecarboxylate, and the like, coordinate complexes of palladium with ligands such as described above and illustrated by Pd (II) acetylacetonate, Pd (II) dimethyl malonate, and the like.

It is important, in order to obtain maximum production of the cuprous acylate and/or cuprous ammonium acylate, that the reaction mixture be essentially free of elemental oxygen. The presence of elemental oxygen in the mixture would serve to defeat the reduction since oxygen oxidizes cuprous cation to cupric cation. However, elemental oxygen may be employed after the cuprous acylate or ammonium acylate has been utilized, as indicated above, in for example, the separation of olefins from hydrocarbon mixtures, etc. Thus, the cuprous acylate or cuprous ammonium acylate may be purified by oxidizing the cuprous cation containing occluded impurities such as dienes, $H_2S$, CO, etc., whereby to form the cupric acylate or ammonium acylate, which in turn, can be reduced in accordance with the process described herein to the cuprous species. This provides for simple and highly effective means for purifying the copper for reutilization.

Though the above mixture may be essentially anhydrous, that is, contains less than two weight percent of water basis weight of liquids in the mixture, substantial quantities of water do not appreciably detract from the usefulness of the instant process in the production of cuprous acylates or ammonium acylates. Thus, the water content of a non-homogeneous or homogeneous liquid phase reaction mixture may be up to 20 percent by weight of the liquid components of the mixture, through it is desirable to keep the water content below about 10 percent by weight of the liquid components. The water should be essentially free of impurities and, therefore, deionized or distilled water is preferred.

For practical and optimum results it is highly desirable to achieve the maximum solubility of Cu (II) acylate or ammonium acylate in a liquid phase reaction system. Thus, it is oftentimes desirable to exceed the normal maximum solubility of Cu (II) whereby to provide a larger Cu (II) acylate or ammonium acylate reservoir. Thus, it it possible to operate with a slurry of Cu (II) and thus provide for a non-homogeneous liquid phase reaction system. An additional feature of this invention involves the addition of alkali metal acylates to the reaction mixture in amounts sufficient to allow for dissolution of cupric acylate or cupric ammonium acylate in the reaction system beyond its normal solubility range at the temperature of the reaction mixture. Thus, upon the addition of potassium, sodium or lithium acylates, such as described before with reference to titratable bases, it is possible to significantly enchance the amount of cupric acylate or cupric ammonium acylate in the solution far beyond that which is obtainable without the presence of the alkali metal acylates. The particular alkali metal acylate selected is dependent upon the particular cupric acylate used in the mixture. In the above manner, it is possible to obtain reduced cupric salt solutions containing a maximum concentration of cuprous acylate therein.

The concentration of the olefinic compound in the reaction mixture depends upon many variables. For example, in the case of a homogeneous liquid phase reaction, the solubility of the olefinic compound in the liquid is dependent upon its character, i.e., whether it is a liquid or gaseous compound at operating temperatures. Of course, a liquid olefinic compound is typically easily incorporated in the liquid phase and the extent of incorporation is dependent upon the solvent employed, e.g., whether the solvent is a carboxylic acid and/or an inert liquid organic compound. In the case where the olefinic compound is gaseous at operating conditions, the solubility of the olefinic compound under operative conditions of the reaction is proportional to the pressure or differently expressed, the partial pressure of the compound above the liquid reaction mixture will directly affect the amount of compound incorporated in the reaction mixture and hence the rate of reduction.

In general, the amount of olefinic compound provided in the reaction mixture should be sufficient to provide for complete reduction of the cupric cations present in the reaction mixture. The practical upper limit of the concentration of olefin is that amount which can be reasonably put into the reaction mixture under operative conditions to achieve the maximum rate of reduction.

The process of this invention can be effected in equipment fabricated of glass, metal such as stainless steel, nickel, alloys thereof, and other conventionally employed materials best suited for the particular needs of the contemplated operative conditions.

One suitable technique for effecting the reduction reaction is to simply prepare a liquid mixture of the cupric acylate or cupric ammonium acylate, solvent, and the reducible metal compound. Under the desired operative conditions of temperature and pressure, the olefinic compound, e.g., ethylene, can be introduced into the liquid phase reaction medium. As a result thereof there occurs spontaneous reduction of the cupric cation to the cuprous cation.

The reaction may also be effected utilizing an inert liquid organic solvent, such as described above. These organic solvents are typically polar compounds which are capable of enhancing the solubility of the metal salts or complexes and the cupric acylates in the homogenous liquid reaction mixture. These solvents are inert with respect to the reagents and products produced. In view of their ability to enhance solubility of the reducible agents, the reaction rates are favorably increased.

The reaction mixture containing the cuprous acylate or ammonium acylate, solvent and reduced form of metal salt or complex, may be treated to provide a cuprous acylate and/or cuprous ammonium acylate solution which can be utilized in many fields of applications. The separation of components other than the cuprous salts may be effected in accordance with known procedures such as decantation, filtration, crystallization, distillation, and the like. The cuprous salts remaining in solution after such treatment can be utilized in the preparation of solutions which are useful for the separation of olefinic hydrocarbons from petroleum hydrocarbon mixtures and for the removal of carbon monoxide from synthesis gas.

The optimum conditions for the reduction of the Cu (II) salts to Cu (I) salts do not always lead to an optimum solution for many of the uses for which copper (I) salts are utilized. For example, many of the uses require much more water and much more ammonia or amine in the copper (I) solutions than that which would be desirable during the reduction step. However, the reduction method of this invention leads to a solution of Cu (I) and Cu (II) salts in an alkanoic acid solution which not only is useful per se for the extraction of olefins from saturated hydrocarbon mixtures but is also useful for the formulation of more conventional extractant solutions which are well known in the art. The copper (I) alkanoate solutions of this invention may be diluted with ammonia or amines and water to obtain the conventional copper liquor so useful in, e.g., ammonia synthesis for the removal of the carbon oxides.

The solutions of this invention, after removal of the catalyst by filtration, may be used per se or may be diluted with more acid to form acid solutions (containing up to 20 percent water) which are useful for removing dienes as their cuprous complexes from their mixtures with olefins and saturated hydrocarbons.

For example, through the solution may be passed a hydrocarbon mixture of diolefins such as butadiene or piperylene, as well as mono-olefins such as butylene, isobutylene, and the like, whereby to effect absorption or dissolution of the diolefin components from the mixture into the cuprous acylate solution, at low temperatures such as from between 0° C. and 50° C. This technique is best effected by bubbling the petroleum mixture through the cuprous salt solution.

Substantially all of the occluded dissolved polyolefins may be removed from the solution by distillation at a temperature of from about 25° C. and 120° C.

The solution may also be favorably employed in the separation of carbon monoxide and carbon dioxide from admixture with other gases such as nitrogen and hydrogen, by passage of the gas mixture through the solution. This may be effected at a temperature of from about 0° C. to about 50° C., and at a pressure preferably above one atmosphere. The valuable CO absorbed in the solution may be separated therefrom by heating the solution at a temperature of from 50° C. and above, preferably at a pressure less than one atmosphere.

This method of separating gaseous components from mixtures is significantly desirable because it allows for the desorption of the gas from the solution free of contaminants which could otherwise be contributed by the solution. For example, in known hydrocarbon separation processes which involve the solution absorption of hydrocarbon species into the aqueous ammoniacal cuprous acylate solution, desorption from the solution of the hydrocarbon species results in releasing ammonia gas in admixture with the hydrocarbon. As a result, it is necessary to effect subsequent separation of ammonia from the hydrocarbon. This represents a costly step. The instant solution employed as described above completely avoids the contamination of the desorbed gases.

The following examples serve to illustrate specific embodiments to which the present invention is not limited.

*Example I*

A solution of 48 grams of copper (II) acetate, 68.7 grams lithium acetate, 45.9 grams of potassium acetate, and 3 grams of palladium acetate in 300 grams of glacial acetic acid was heated to 90–95° C. and 100 grams of butene-1 were admitted under a pressure of 150 p.s.i. After four hours at this temperature, the vessel was vented. An analysis showed that 51 percent of the Cu (II) had been reduced to Cu (I).

The above reaction mixture was filtered to give a solution containing Cu (I) and Cu (II) acetates suitable for the formulation of copper liquor useful in the removal of carbon oxides from ammonia synthesis gas. The addition of ammonia and water to the filtered solution gave copper liquor containing between 50–75 grams of total copper per liter and an ammonia content of 170 grams per liter. The ratio of Cu (II) to Cu (I) in the liquor was sufficiently high to minimize copper metal deposition during its use.

Ammonia synthesis gas which has been scrubbed with water to remove most of the carbon dioxide and which consists primarily of nitrogen, hydrogen, <1 percent carbon dioxide and <0.02 percent of carbon monoxide is scrubbed counter-currently in an absorption tower with the above copper liquor at 5° C. under a pressure of 1,500 p.s.i. Most of the carbon dioxide and carbon monoxide is removed in this tower. Additional towers may be used in series to reduce the carbon monoxide level to a few parts per million.

The spent liquor is regenerated by heating to 70–90° C. The ammonia lost in the regeneration step is replaced and the liquor is ready for re-use.

*Example II*

A solution of 80 grams of copper (II) propionate, 64 grams of sodium propionate and 2.24 grams of palladium diacetate in 200 grams of propionic acid was treated for one hour at 102° C. with ethylene at 500 p.s.i. pressure.

After venting and cooling the reaction mixture, analysis showed that 91 percent of the copper (II) had been reduced to copper (I). After filtering the solution it is useful in the preparation of copper liquors by the addition of ammonia and water. Acetic and formic acids may also be added, if desired, to lower the freezing point of the mixture. Such solutions are useful not only for carbon monoxide removal but may be also used to selectively extract olefins and diolefins from hydrocarbon streams.

*Example III*

A solution of 48 grams of copper (II) acetate, 68.7 grams of lithium acetate, 45.9 grams of potassium acetate, and 3 grams of palladium acetate in 300 grams of acetic acid was treated with 114 grams of propylene at 95° C. at 230 p.s.i. for a period of 18 hours. After venting, an analysis indicated that 41 percent of the copper (II) had been reduced to copper (I).

A similar run in which one-half of the potassium acetate was substituted with ammonium acetate gave comparable results.

*Example IV*

A solution of 72 grams of copper (II) propionate, 40 grams of lithium propionate and 2.24 grams of palladium acetate in 100 grams of propionic acid was treated with an excess of ethylene for one hour at 101° C. at a pressure of 500 p.s.i. Cooling and venting of the vessel gave a solution in which 74 percent of the copper (II) had been reduced to copper (I) propionate. The palladium catalyst was recovered by filtrations. Dilution of the filtrate with water and methylamine in such proportions as to yield one liter of solution having a pH of 11 gives a solution which is especially useful for the extraction of diolefins from hydrocarbon streams.

*Example V*

A solution of 11.2 grams of copper (II) acetate, 17.4 grams of potassium acetate, 11.6 grams of lithium acetate and 0.45 gram of palladium diacetate in 100 grams of acetic acid was stirred with excess ethylene at atmospheric pressure for one and one-half hours at 96° C. Analysis of the reaction mixture indicated that 33 percent of the copper (II) acetate had been reduced to copper (I) acetate.

Though the above specifically illustrates this invention, the invention is not to be limited thereby except to the extent provided in the claims.

What is claimed is:

1. A process for the manufacture of cuprous acylates and/or cuprous ammonium acylates which comprises contacting:
   (1) a cupric salt of the group consisting of cupric acylates, cupric ammonium acylates, and mixtures thereof, the acylate moiety of said cupric salt represents the anion of a monocarboxylic acid which has an ionization constant of less than $5 \times 10^{-3}$ as determined in water at 25° C.
   (2) an olefinically unsaturated compound,
   (3) a palladium (II) compound of the group consisting of palladium (II) salts which have an ionization constant not greater than $5 \times 10^{-3}$ as determined in water at 25° C. and complexes of palladium (II), and
   (4) a saturated aliphatic monocarboxylic acid having a melting point less than 150° C. and a boiling point of less than 250° C.;

the concentration of said palladium (II) compound being from about 0.00001 to about 1.5 weight percent calculated as palladium (II) based on the total weight of the liquids employed; at an elevated temperature; and for a period of time sufficient to convert at least a portion of said cupric salt to the corresponding cuprous salt.

2. The process of claim 1, wherein said olefinically unsaturated compound is ethylene and wherein said saturated aliphatic monocarboxylic acid is acetic acid.

3. The process of claim 1 wherein said process is effected in the essential absence of halogen and strong mineral acids which have an ionization constant greater than $5 \times 10^{-3}$ as determined in water at 25° C.

References Cited

UNITED STATES PATENTS 1,977,659  10/1934  Watts _____ 260—677 X
3,102,919  9/1963  Hirschbeck et al. ___ 260—677 X EARL C. THOMAS, *Primary Examiner.*